May 3, 1955
A. J. MORSCHEL
2,707,395
ELECTRIC REMOTE READING TANK GAUGE
Filed April 22, 1952
3 Sheets-Sheet 1
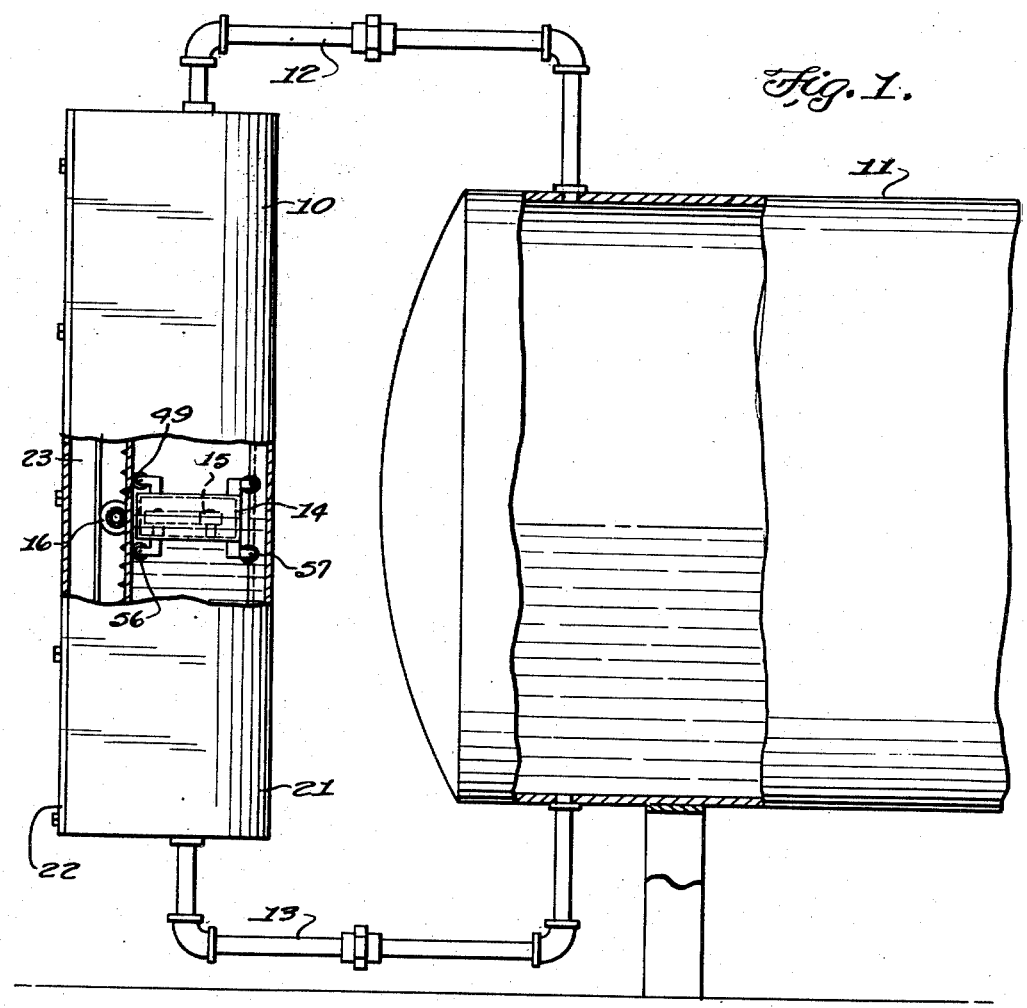
INVENTOR.
Albert J. Morschel,
BY Victor J. Evans & Co.
ATTORNEYS

United States Patent Office 2,707,395
Patented May 3, 1955

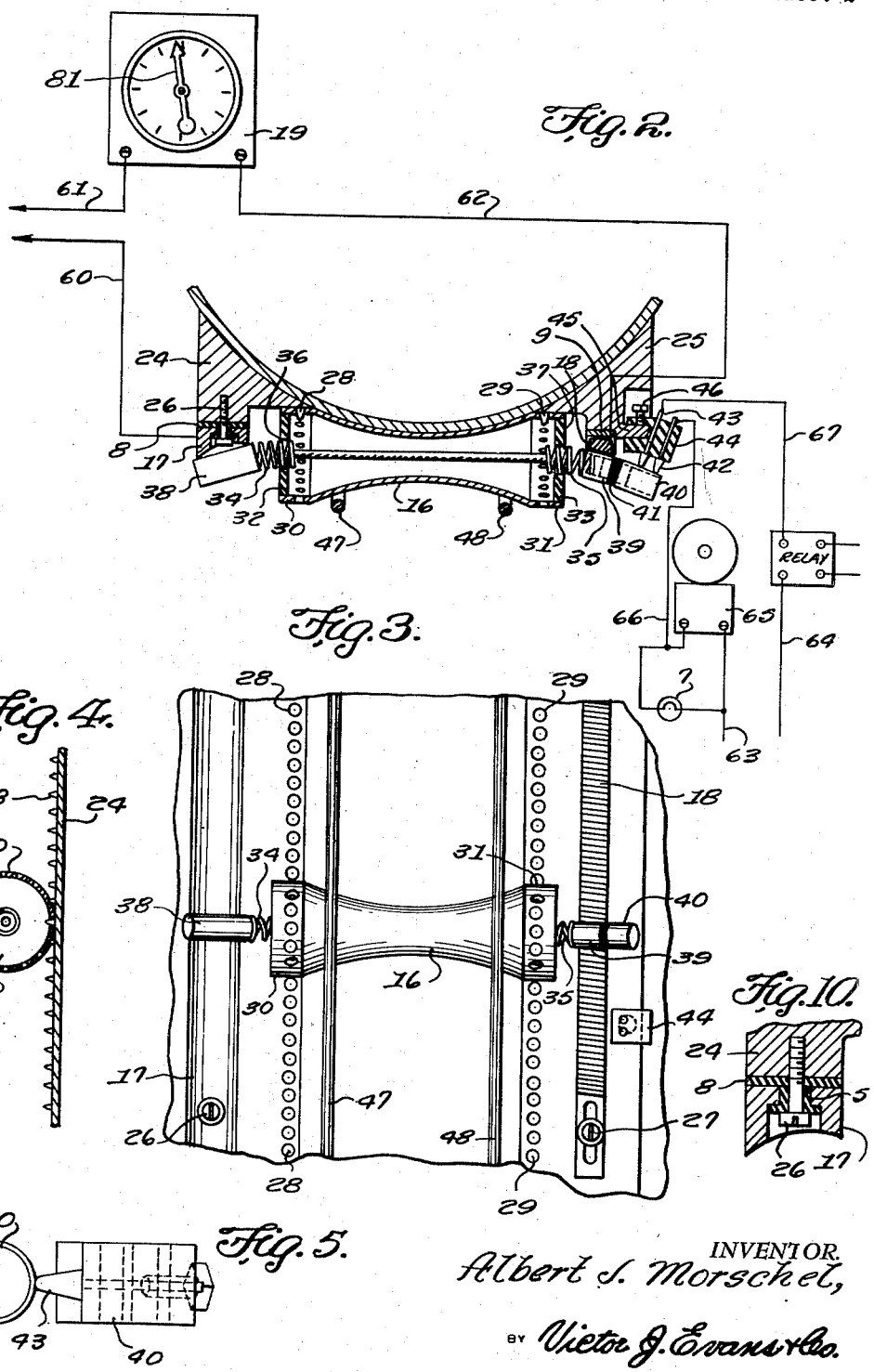

2,707,395

ELECTRIC REMOTE READING TANK GAUGE

Albert J. Morschel, Yonkers, N. Y., assignor to Liquidvision Gauge and Control Corporation, Oceanside, N. Y., a corporation of New York Application April 22, 1952, Serial No. 283,538

10 Claims. (Cl. 73—313)

This invention relates to tank gauges of the type constantly indicating the amount of liquid in a tank without opening the tank, and in particular a tank gauge wherein a column is connected by a pipe to upper and lower parts of a tank whereby liquid in the column follows the level of liquid in the tank and in which a magnet in a float in the column actuates a hollow roller providing a follower that travels over a scale, a contact strip, and resistance strip and controls the position of a pointer on a dial at a remote location to indicate the amount of liquid in the tank.

The purpose of this invention is to provide means for converting mechanical means for indicating the level of liquid in a tank to electrical means for actuating a gauge at a remote point to show the amount of liquid in the tank.

Various devices have been provided for indicating the level of liquid in a tank but where tanks are positioned in the ground or in a dark location in the basement of a residence, or in a battery in a tank yard it is difficult to show the amount of liquid in the tank at a point, such as a control board, positioned above the tank. With this thought in mind this invention contemplates a float having a magnet therein for carrying an object formed of material having magnetic attraction on the outer surface of a column and means whereby the position of the object having magnetic attraction on the column is indicated on a gauge positioned at a remote point and particularly above or below the tank.

The object of this invention is, therefore, to provide means operating on the principle of a rheostat for indicating the liquid level of liquid in a tank at a remote point.

Another object of the invention is to provide a tank gauge having a column with the ends thereof connected to upper and lower parts of a tank with a hollow roller held against the column by magnetic attraction and positioned to travel over a resistance strip whereby a position of the object having magnetic attraction may readily be indicated at a remote point.

A further object of the invention is to provide means for converting mechanical structure into electrical impulses for showing the position of a traveling roller or pointer on a gauge at a remote point which is connected to a resistance through suitable circuits including audible and visible alarms.

A still further object of the invention is to provide a remotely positioned liquid level indicating gauge and switch control device for indicating the level of liquid in a tank at a remote point which is of a simple and economical construction.

With these and other objects and advantages in view the invention embodies a column inserted in a tank or positioned with the upper and lower ends connected to upper and lower parts of a tank, a float having a magnet therein positioned in the column, a roller positioned to coact with a scale on the surface of the column, and a resistance connected to a gauge or indicator and positioned to be engaged by the said roller.

Other features and advantages of the invention will appear from the following description taken in connection with the drawings wherein:

Figure 1 is a side elevational view showing the end of a tank and a column with the upper and lower ends of the column connected to the tank, and with parts broken away showing a float having a magnet therein positioned to coact with a roller on a scale in the column.

Figure 2 is a sectional plan through the roller compartment of the column with the parts shown on an enlarged scale and with a partial wiring diagram showing connections to an indicator and also to an alarm device.

Fig. 3 is a vertical section through the intermediate part of the roller compartment with parts broken away and showing the roller in the position as illustrated in Figure 2.

Figure 4 is a vertical section through the roller and illustrating the roller in combination with one of the pin rails on which the ends of the roller travel.

Figure 5 is a detail illustrating one of the contacts positioned to engage a cylindrical brush carried by the roller.

Figure 6 is a sectional plan through the column and roller compartment showing a plan view of the float.

Figure 7 is a similar section through the column and also showing a section through the float.

Figure 8 is a vertical section through the float illustrating the position of the float in the column.

Figure 9 is a view showing a modification wherein the column is incorporated in a tank.

Figure 10 is a section showing a detail illustrating an insulating bushing on one of the screws for attaching the contact bars to the mounting bars.

Figure 11 is a detail showing an adjusting screw for adjusting the position of the resistance.

Referring now to the drawings wherein like reference characters denote corresponding parts the improved tank gauge of this invention includes a column 10, connected to upper and lower parts of a tank 11 with pipes 12 and 13, a float 14 having a magnet 15 therein, a hollow roller 16, positioned to travel over the outer surface of the column, a contact bar 17 and a resistance strip 18, and a gauge or indicator 19 as shown in Figure 2, which is connected in the circuit through the bars 17 and 18.

The column 10 is formed with a tubular section having side plates 20 and 21 extended therefrom and a face plate 22 is positioned on the outer edges of the plates 20 and 21 which provides a sealed compartment or casing 23 in which the roller 16 is positioned.

Parallel mounting bars 24 and 25 are secured by brazing, soldering, or other suitable means, to the outer surface of the column 10 and, as shown in Figure 2, the contact bar 17 is mounted on the bar 24 with screws 26 and the resistance strip 18 is mounted on the bar 25 with screws 27.

The contact bar 17 is insulated from the mounting bar 24 with insulation 8, and the resistance strip 18 is insulated from the mounting bar 25 with insulation 9. The screws 26 and 27 are insulated from the bars 17 and 18 with insulating bushings 5, as shown in Figure 10.

The inner edges of the bars 24 and 25 are provided with spaced conical shaped projections or pins 28 and 29, respectively, and cylindrical ends 30 and 31 of the roller 16 are provided with spaced openings positioned to mesh with the pins 28 and 29 whereby the hollow roller is retained in position and is not moved by shocks, jars, and the like.

The ends of the roller or follower member 16 are provided with insulating discs 32 and 33 and springs 34 and 35, respectively, are mounted in centrally positioned openings 36 and 37 of the discs. A contact shoe 38 is carried by the spring 34 and contact shoes 39 and 40, separated by insulation 41, are carried by the spring 35. The shoe 39 is positioned to travel on the resistance strip 18 and the shoe 40 is positioned to engage contact points 42 and 43, both of which are positioned in a horizontal plane and secured in position with an insulating block 44 that is clamped to a flange 45 on the edge of the bar 25 with a set screw 46.

Spaced vertically disposed guard rails 47 and 48 extend upwardly over roller 16 to prevent roller 16 from being jarred away from pins 28. By using rails 47 and 48 to prevent roller 16 from moving off pins 28 roller 16 will be sure to stay in alignment with the horizontal center of magnetic field of influence of magnet 15.

The position of the roller is controlled by the magnet 15 in the float 14 and the float travels vertically with the liquid level in the tank 11.

As illustrated in Figures 6 and 7 the float is retained in spaced relation to the inner surface of the column 10 with a roller 49 journaled between ears 50 and 51 at one side, and rollers 52 and 53 which are journaled in a bracket 54 and positioned to engage a V-shaped rib 55 at the opposite side. The rollers are similar on both the upper and lower surfaces of the float, and, as shown in Figure 1 a roller 56 similar to the roller 49 is positioned below the float at the side of the column on which the roller 16 is positioned and rollers 57, similar to the rollers 52 and 53 are positioned below the opposite side.

As illustrated in Figures 7 and 8 the magnet 15 is secured in position in the float with clamps 58, the clamps being held by bolts 59.

A contact bar 17 is connected to a suitable source of current supply with a wire 60 and a wire 61, also connected to the source of current supply, is connected to the indicator 19 the opposite side of which is connected by a wire 62 to the resistance strip 18.

Contact 42 is connected by wire 66 to an alarm bell 65 and a warning light 7. The opposite terminals of the alarm bell and warning light are connected by wire 63 to one side of a source of current supply. Contact 43 is connected by wire 67 to one terminal of a relay. The opposite terminal of the relay is connected by wire 64 to the opposite side of a source of current supply. The relay can be used in conjunction with the alarm circuit when it is desired to control a motor or a magnetically actuated valve by suitable switching arrangement. It is understood that the contacts may be used for either audible or visible alarms or to control electrically actuated equipment by any suitable arrangement of the wiring and current supply.

In the design illustrated in Figure 9 a column 70, similar to the column 10 is connected to a tank 71 and a float 72 in the column 70, and having a magnet therein, holds a hollow roller or follower 73 in a compartment 74, similar to the compartment 23. The compartment 74 is provided with side walls similar to the walls 20 and 21 and the outer face of the compartment is enclosed with a cover 75, similar to the cover 22.

The contacts of the cylindrical elements of the column 70 are connected by wires 76 and 77 to a source of current supply, and an indicator 78 which is provided with a pointer 79 is connected in the wire 76.

As illustrated in Figure 9, the upper and lower ends of the column are provided with openings 80, thereby establishing communication between the interior of the column and the interior of the tank.

With the parts arranged in this manner the float 14 or the float 72 travel vertically with the liquid level in a tank and with the shoe 39 of the hollow roller 16 continuously in engagement with the resistance strip 18 the pointer of the indicator 19 or 78 will show the level of liquid in the tank.

It will also be noted that with the parts arranged in this manner the zero or empty position of the pointer 79 on the dial can be set or adjusted by turning the thumb screw 82, which adjusts, vertically, the resistance strip 18, which strip is connected by pins 83 to the thumb screw 82 through a cross head 84 that is slidably mounted in a frame 85. The adjusting screw is held in a clamp 86, and a rod 87 extends from the clamp and cross head through a bellows seal 88, the rod 87 having an eye 89 through which the pin 83 extends.

The float 14 may be provided with counterweights 68 and 69, as shown in Figure 7 to compensate for the weight of the magnet.

The column 10 mounting members 24 and 25, float 14, pins 28, covers 20 and 21, guard rails 47 and 48, and ears 50 and 51 are all of non-magnetic material so that the position of hollow magnetic roller 16 is influenced only by the magnet 15 in float 14.

With the parts arranged in this manner the position of the roller 16 and consequently the liquid level in the tank may be observed from a control panel and the panel may be positioned in an office or control room or located at a remote point.

As the roller 16 approaches the upper end of the column it engages contacts similar to the contacts 42 and 43, whereby a circuit is completed to a light and bell so that a warning signal is provided and also as the roller approaches the lower end of the column it engages similar contacts and an alarm is given by a light and bell. Visible and at the same time audible alarms are, therefore, provided as the level of liquid in the tank reaches upper and lower parts of the tank, respectively.

The column 23 is gas-tight and filled with helium or other inert gas the object of which is to eliminate oxidation or burning of the resistance strip, contact shoes, and the switch contact points, and to prevent sticking of follower member or roller 16 to column 10 that might be caused by freezing of moisture or condensate in column 23. This inert gas also prevents fire from starting in column 23.

It will be understood that modifications may be made in the design and arrangement of the parts without departing from the spirit of the invention.

What is claimed is:

1. A tank gauge comprising a column, means connecting upper and lower ends of the column to upper and lower parts of a tank, respectively, a float having a magnet therein positioned in the column, a vertically disposed contact strip positioned on the column, a resistance mounted on the column and positioned parallel to the said contact strip, a roller positioned to travel on the said contact strip and resistance, said roller having contact shoes positioned to engage the contact strip, resistance strip, and contact and said shoes being carried by springs extended from the ends of the roller said roller being held against the surfaces of the said contact strip and resistance by the magnet in the float mechanical means for retaining the roller in position against the contact strip and resistor, a gauge having a pointer, and a circuit connecting the contact strip and resistance to the gauge whereby the pointer of the gauge follows the position of the said roller.

2. A tank gauge comprising a column, means connecting upper and lower ends of the column to upper and lower parts of a tank, respectively, a float having a magnet therein positioned in the column, means preventing horizontal rotation of the float in the column, a vertically disposed contact strip positioned on the column, a resistance mounted on the column and positioned parallel to the said contact strip, a roller positioned to travel on the said contact strip and resistance, said roller being held against the surface of the said contact strip and resistance by the magnet in the float said roller and column being provided with meshing elements to prevent slippage of the roller in relation to the contact strip and resistance, a gauge having a pointer, and a circuit connecting the contact strip and resistance to the gauge whereby the pointer of the gauge follows the position of the said roller.

3. A tank gauge comprising a column, means connecting upper and lower ends of the column to upper and lower parts of a tank, respectively, a float having a magnet therein positioned in the column, a vertically disposed contact strip positioned on the column, a resistance mounted on the column and positioned parallel to the said contact strip, means adjusting the position of the said resistance, a roller positioned to travel on the said contact strip and resistance, said roller being held against the surfaces of the said contact strip and resistance by the magnet in the float said roller and column being provided with meshing elements to prevent slippage of the roller in relation to the contact strip and resistance, a gauge having a pointer, and a circuit connecting the contact strip and resistance to the gauge whereby the pointer of the gauge follows the position of the said roller.

4. A tank gauge comprising a column, means connecting upper and lower ends of the column to upper and lower parts of a tank, respectively, a float having a magnet therein positioned in the column, a vertically disposed contact strip positioned on the column, a resistance mounted on the column and positioned parallel to the said contact strip, a roller positioned to travel on the said contact strip and resistance, said roller being held against the surfaces of the said contact strip and resistance by the magnet in the float said roller and column being provided with meshing elements to prevent slippage of the roller in relation to the contact strip and resistance, a gauge having a pointer, a circuit connecting the contact strip and resistance to the gauge whereby the pointer of the gauge follows the position of the said roller, and means providing signals as the roller approaches the upper and lower ends of the column.

5. In a tank gauge, the combination which comprises a vertically positioned column, pipes connecting upper and lower ends of the column to upper and lower parts of a tank, a float having a magnet therein positioned in the column, means preventing horizontal rotation of the float in the column, a contact strip positioned on the column, a resistance mounted on the column and positioned parallel to the said contact strip, a contact member bridging said strip and resistance, said contact member formed of material having magnetic attraction whereby the member is retained in position by the magnet of the float in the column spaced parallel rails positioned to retain the contact member in engagement with the resistance and contact strip, an indicator, means connecting the contact strip and resistance to the indicator whereby the position of the contact member in the column is registered on the indicator.

6. In a tank gauge, the combination which comprises a vertically positioned column, pipes connecting upper and lower ends of the column to upper and lower parts of a tank, a float having a magnet therein positioned in the column, means preventing horizontal rotation of the float in the column, contact strips positioned on the column, a resistance mounted on the column and positioned parallel to the said contact strips, a contact member bridging said strips and resistance, said contact member formed of material having magnetic attraction whereby the member is retained in position by the magnet in the float in the column spaced parallel rails positioned to retain the contact member in engagement with the resistance and contact strip, an indicator, means connecting the contact strips and resistance to the indicator whereby the position of the contact member in the column is registered on the indicator, alarm devices, and circuits connecting the said alarm or control devices to the indicator circuit for providing alarms or controls.

7. In a tank gauge, the combination which comprises an elongated vertically disposed column means adapted to connect upper and lower parts of the column to upper and lower parts of a tank whereby liquid level in the column corresponds with the liquid level in the tank to which the column is connected, spaced guide rails positioned on the outer surface of the column, a float positioned in the column, a magnet carried by a float in the column, a hollow follower member of material having magnetic attraction positioned against said guide rails, said follower member normally held in alignment with the horizontal center of the magnetic field of the magnet on said float, means preventing accidental horizontal displacement of said follower member, shoes carried by springs on the ends of said follower member, a plurality of contacts positioned to be engaged by said shoes on the follower member, and a circuit having alarm devices therein connected to said contacts.

8. A tank gauge as described in claim 7, wherein the floating member and rails are provided with meshing elements to prevent slippage of the floating member.

9. A tank gauge comprising a column, means connecting upper and lower ends of the column to upper and lower parts of a tank, respectively, a float having a magnet therein positioned in the column, a vertically disposed contact strip positioned on the column, a resistance mounted on the column and positioned parallel to the said contact strip, a roller positioned to travel on the said contact strip and resistance, said roller being held against the surfaces of the said contact strip and resistance by the magnet in the float, said column having spaced rows of projections parallel to the contact strip, said roller being hollow and having rows of openings in the ends positioned to mesh with the projections of the column, a gauge having a pointer, and a circuit connecting the contact strip and resistance to the gauge whereby the pointer of the gauge follows the position of the said roller.

10. A tank gauge comprising a column, means connecting upper and lower ends of the column to upper and lower parts of a tank, respectively, a float having a magnet therein positioned in the column, a vertically disposed contact strip positioned on the column, a resistance mounted on the column and positioned parallel to the said contact strip, a roller positioned to travel on the said contact strip and resistance, said roller being held against the surfaces of the said contact strip and resistance by the magnet in the float, guard rails spaced from the contact strip and positioned to prevent accidental displacement of the roller in relation to the contact strip and resistance, a gauge having a pointer, and a circuit connecting the contact strip and resistance to the gauge whereby the pointer of the gauge follows the position of the said roller.

References Cited in the file of this patent

UNITED STATES PATENTS

| Number | Name | Date |
| --- | --- | --- |
| 1,264,115 | Moore | Apr. 23, 1918 |
| 1,768,446 | Gron | June 24, 1930 |
| 2,233,572 | Atkins | Mar. 4, 1941 |
| 2,556,346 | Stromberg | June 12, 1951 |
| 2,592,929 | Matchett | Apr. 15, 1952 |